April 17, 1956        F. J. AVERY        2,741,974
APPARATUS FOR TREATING MEAT AND THE LIKE
Filed Sept. 8, 1950        2 Sheets-Sheet 1
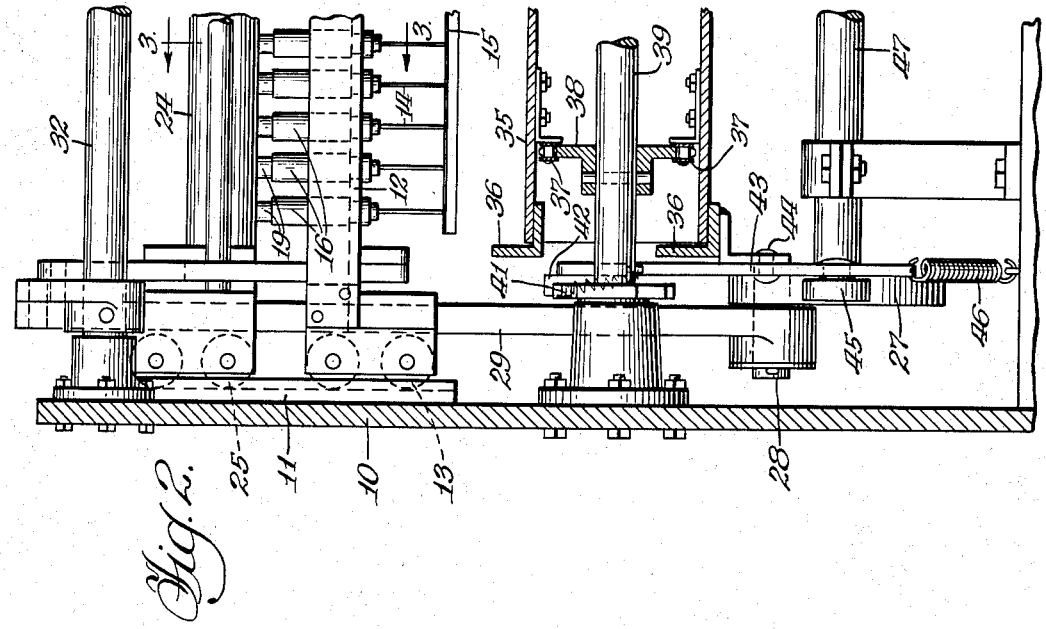
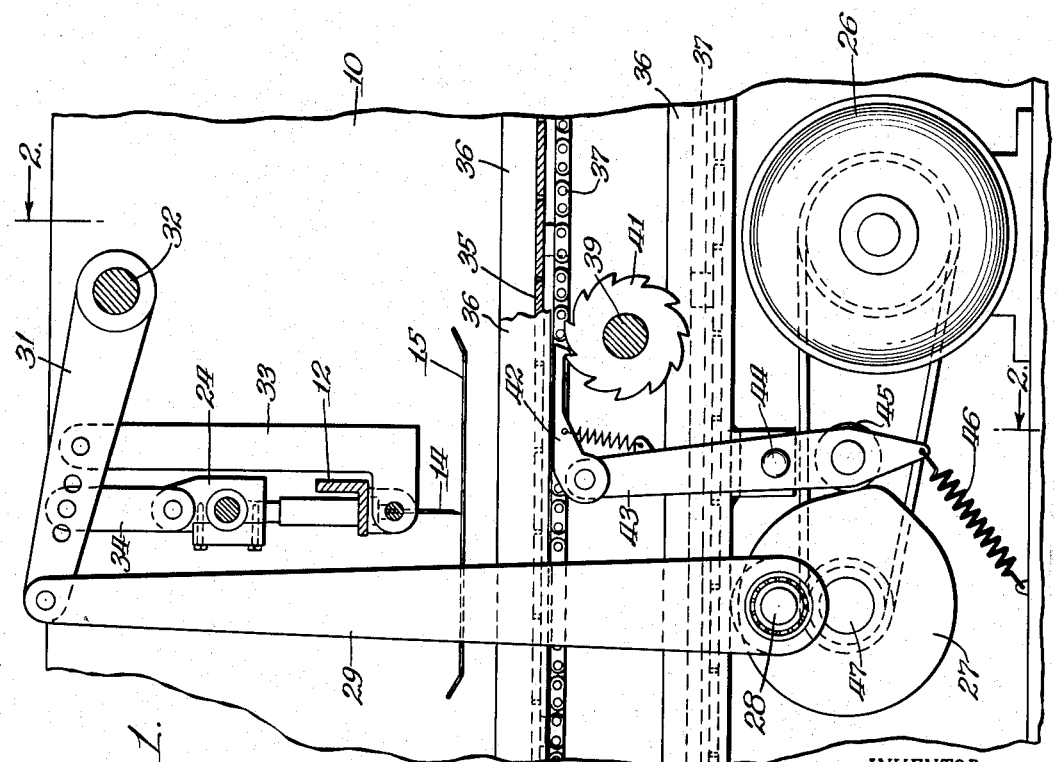
INVENTOR.
Fred J. Avery
BY
E. S. Booth
Atty.

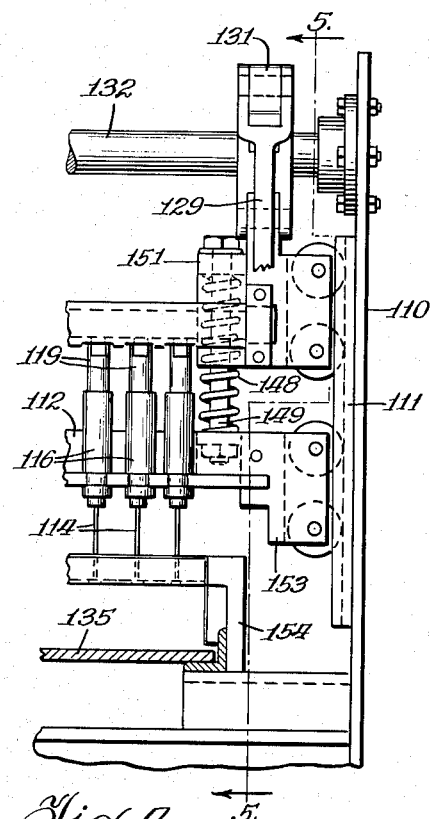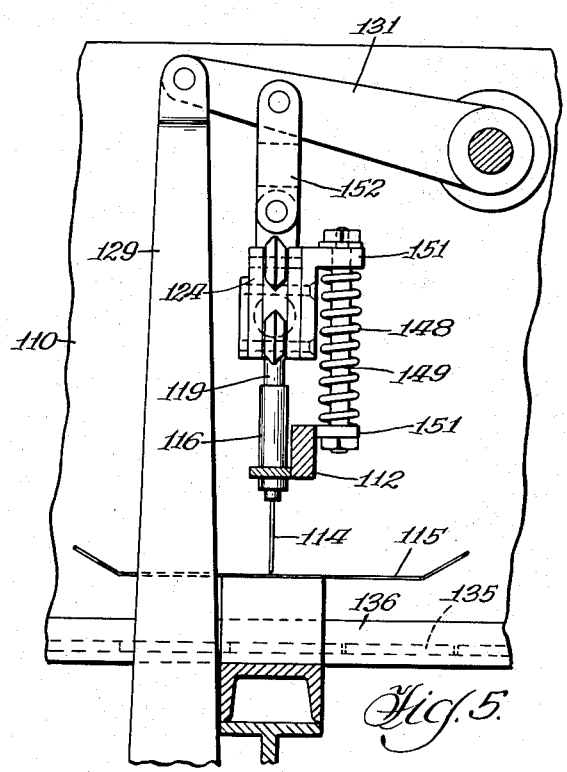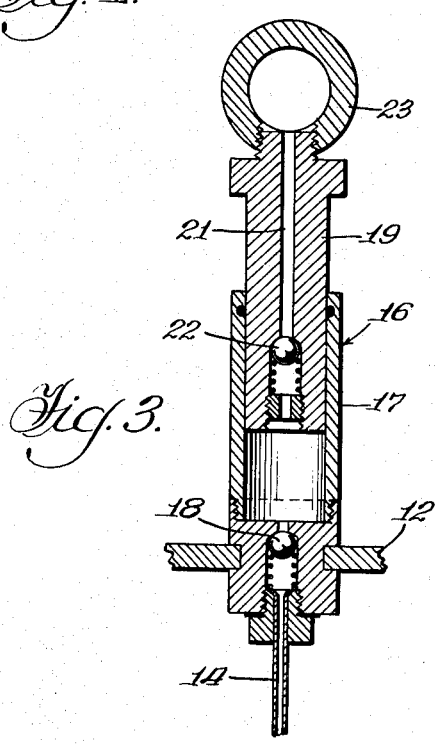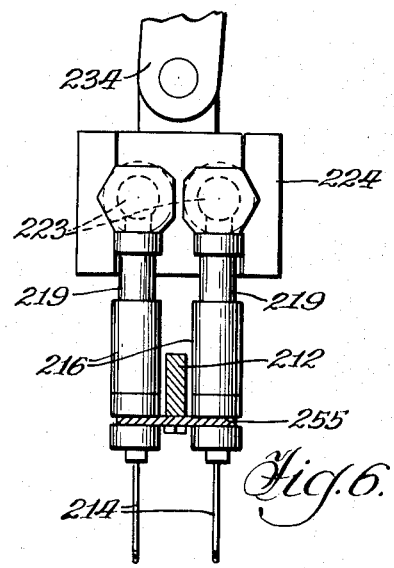

United States Patent Office 2,741,974
Patented Apr. 17, 1956

2,741,974

APPARATUS FOR TREATING MEAT AND THE LIKE

Fred J. Avery, La Grange, Ill.

Application September 8, 1950, Serial No. 183,759

7 Claims. (Cl. 99—257)

This invention relates to apparatus for treating meat and the like and more particularly to needling apparatus to inject a treating solution into a body of material to be treated.

It has been proposed to treat or cure food products such as bacon, cheese and the like by injecting a solution into a body of the product at uniformly spaced points. This type of treatment insures a uniform distribution of the solution through the product to produce a rapid and highly effective treatment. One apparatus for this purpose is described and claimed in my copending application Serial No. 100,727, filed June 22, 1949, now Patent No. 2,587,024.

The present invention has for one of its objects the provision of apparatus of this general type in which a measured quantity of treating liquid is positively forced into the material at a plurality of points. According to one feature of the invention the liquid is discharged through a hollow needle at a measured rate as the needle penetrates the material or, if preferred, the needle can first penetrate the material to a predetermined depth and then have the liquid forced therethrough.

Another object is to provide apparatus including a plurality of needles in which an exact predetermined quantity of liquid is discharged through each needle on each operation. In the preferred construction a separate positive displacement pump is provided for each needle and the pumps are operated simultaneously by the same operating mechanism which moves the needles.

Still another object is to provide apparatus in which the material to be treated is moved transverse to the needles by the same operating mechanism which moves the needles and operates the pumps.

The above and other objects and advantages of the invention will be more readily apparent when read in connection with the accompanying drawing in which:

Figure 1 is a side view with parts in section of a treating apparatus embodying the invention;

Figure 2 is a section on the line 2—2 of Figure 1;

Figure 3 is an enlarged partial section on the line 3—3 of Figure 2;

Figure 4 is a view similar to Figure 2 of an alternative construction;

Figure 5 is a section on the line 5—5 of Figure 4; and

Figure 6 is a partial side elevation with parts in section of another alternative construction.

The apparatus as shown in Figures 1–3 comprises a frame 10 provided with vertical tracks or guideways 11 at its opposite sides.

A cross bar or head 12 is supported for vertical reciprocating movement in the guideways 11 by means of rollers 13 on the head engaging the guideways. The head carries a plurality of hollow needles 14 extending downward therefrom through openings in a fixed stripper plate 15 to enter a body of material to be treated as the head reciprocates.

The needles 14 are supplied with treating liquid such as a meat curing solution by means of individual piston displacement pumps 16 communicating with the needles respectively. As shown in Figure 3, each of the pumps comprises a cylinder 17 secured at its lower end to the head 12 and communicating with one of the needles 14 through a check valve 18. A piston or plunger 19 is slidable in the cylinder and is formed with a bore 21 therethrough communicating past a downwardly opening check valve 22 with the interior of the cylinder. The piston or plunger 19 is connected at its upper end to a supply manifold 23 through which treating solution is supplied to the pump. The manifold 23 extends through an elongated support or bar 24 which is provided at its ends with guide rollers 25 to guide it for vertical sliding movement in the tracks 11. It will be understood that the manifold 23 communicates with a source of treating liquid through a flexible connection so that it will be maintained full of liquid without interfering with its vertical movement.

To move the head 12 and the bar 24 vertically, a driving motor 26 is provided on the frame and drives a cam disc 27. A crank pin 28 is eccentrically carried by the cam disc and is connected to one end of a connecting rod 29. The upper end of the rod 29 is connected to one end of a lever 31 pivoted on a cross rod 32 on the frame. The lever 31 is connected through a link 33 to the head 12 and through similar link 34 to the bar 24. The links 33 and 34 are connected to the lever 31 at spaced points so that as it swings the bar 24 it will have a greater movement than the head 12 to reciprocate the pistons 19 in the cylinders. That is, each time the lever 31 moves down it will move the head 12 down and will move the bar 24 down a greater amount to force a measured quantity of treating liquid through each of the needles from its connected pump. Preferably the link 34 can be connected to the lever 31 at any one of a plurality of spaced points to adjust the stroke of the pumps. Also the pump cylinders are detachably mounted on the head 12 so that pumps of different sizes can be used as desired.

The material to be treated, such as a slab of bacon or the like, is carried beneath the head on a traveling conveyor 35 supported on angle bars 36 at its sides. The conveyor, as shown, is formed by cross slats connected by an endless chain 37 which is driven by sprocket wheels 38 on a shaft 39. The shaft 39 is driven through a ratchet wheel 41 connected to the shaft and engaged by a pawl 42 pivoted to the upper end of a lever 43. The lever 43 is pivoted on the frame at 44 and carries a roller 45 which is held against the periphery of the cam disc 27 by a spring 46. The cam disc 27, as shown, is circular through the major part of its periphery and is formed with a single riser thereon to swing the lever counterclockwise once during each revolution thereby to turn the ratchet wheel 41 and advance the conveyor. It will be noted that the conveyor is advanced in synchronized, timed relation with the reciprocation of the head so that it moves only when the head is in its upper position with the needles moved from the materials to be treated.

The operating mechanism described above is preferably duplicated at the opposite side of the frame so that the head 12 will be engaged by links 33 at both ends and the bar 24 will similarly be engaged by links 34 at both ends. The cam disc 27 may be carried by a shaft 47 extending completely across the frame to carry a similar disc at the opposite end and the shaft 39 also extends across the frame to carry a sprocket wheel 38 adjacent the opposite end to drive the conveyor. In this way the parts can be moved properly without binding.

In operation a body of material to be treated is placed on the conveyor and the motor is started. Each time the shaft 47 makes a complete revolution, the lever 31 will be rocked first down and then up. During its downward movement, the head 12 will move down to force the needles 14 into the material and at the same time the bar 24 will be moved down to force treating liquid from the pumps through the needles. Thus, the treating liquid is forced into the material as the needles penetrate the material so that it is uniformly distributed throughout the body of material. It will be understood that the needles 14 can be spaced any desired distance to inject treating liquid into the material at points spaced the proper distance for treatment of the particular material in question.

As the head rises, the cams 27 will rock the levers 43 to advance the conveyor one step. The cam and ratchet mechanism is designed to advance the conveyor the desired distance during each cycle preferably a distance equal to the spacing between the needles 14. In this way, as the machine continues to operate, measured quantities of treating liquid will be injected into the material at uniformly spaced points throughout the entire area thereof to produce a uniform and highly effective treatment or cure.

Figures 4 and 5 illustrate an alternative construction in which the needles are first forced into the material and subsequently a measured quantity of treating liquid is forced through each needle. As shown in these figures, wherein parts corresponding to like parts in Figures 1 and 2 are indicated by the same reference numerals plus one hundred, the head 112 and the bar 124 are connected by a compression spring 148 threaded over a bolt or rod 149 which can slide through flanges 151 on the head and bar. A single link 152 connects the lever 131 to the bar 124. Otherwise the construction is substantially identical to that of Figures 1 and 2.

In operation of this modification, when the lever 131 is moved downward it will move both the bar 124 and the head 112 downward simultaneously, the force of the springs 148 being sufficient to force the needles 114 into the material to be treated. When the needles have been forced into the material the desired distance, carriages 153 at the ends of the head 112 will strike stop projections 154 on the frame to prevent further downward movement of the head. As the lever 131 continues to swing downward, the springs 148 will be compressed, allowing the bar 124 to move downward further thereby moving the pistons 119 into the pump cylinders to force treating liquid through the needles. In this construction, since there is a separate piston displacement pump for each needle, a measured quantity of liquid will be pumped through each needle but no liquid will be pumped until the needles have penetrated the material to the desired maximum extent. For certain types of material this method of treatment may be preferable to that of Figures 1-3.

To speed the operation of the apparatus, it may be desired in some instances to employ multiple rows of needles so that the conveyor can advance through greater distances on each cycle. Figure 6 illustrates a double row mounting, parts therein corresponding to like parts in Figures 1-3 being indicated by the same reference numerals plus two hundred. As shown, two rows of pumps 216 are provided side by side with their cylinders connected by a plate 255 carried by the head 212 which in this instance is a relatively narrow beam lying between the rows of pumps. The cross bar 224 carries two manifolds 223 communicating with the respective rows of pumps and the cross bar is connected to the operating lever through a link 234 corresponding to the link 34 of Figure 1. The needles in the rows are preferably spaced the same distance as the distance between the rows and the conveyor is adjusted to move double this distance during each cycle. In this way the operation may be speeded up substantially over a single row machine and it will be understood that more than two rows of needles and pumps could be used in the same manner as shown in Figure 6 if still greater speed is desired.

While several embodiments of the invention have been shown and described in detail herein, it will be understood that these are illustrative only and are not to be taken as a definition of the scope of the invention, reference being had for this purpose to the appended claims.

What is claimed is:

1. Apparatus for treating meat and the like comprising a support adapted to hold a body of material to be treated, a head, means mounting the head for relative reciprocating movement toward and away from the support, a plurality of hollow needles on the head to penetrate a body of material on the support upon relative movement of the head and support in one direction, a plurality of positive displacement pumps connected to the needles respectively, and each including a cylinder and a piston slidable in the cylinder, a rotary operating device including a crank, a mechanical linkage connected to the crank to be actuated thereby and directly mechanically connected to both the head and the pump pistons simultaneously to reciprocate the head and to slide the pistons in the pump cylinders positively to displace liquid from the cylinders through the needles.

2. Apparatus for treating meat and the like comprising a support to hold a body of material to be treated, a head mounted above the support for reciprocation toward and away from the support, a plurality of hollow needles carried by the head and projecting downward therefrom, a plurality of positive displacement pumps carried by the head and connected to the needles respectively, each of said pumps including a vertical cylinder connected to the head and a piston reciprocable therein, operating means including a lever pivoted at one end and swingable in a vertical plane, a connection from the lever to the head to reciprocate the head, thereby to move the needles downward into penetrating relation with the body of meat on the support and a connection from the pump pistons to a point on the lever spaced from the first named connection to operate the pumps as the head reciprocates.

3. Apparatus for treating meat and the like comprising a support to hold a body of material to be treated, a head mounted above the support for vertical reciprocation toward and away from the support, a plurality of hollow needles carried by the head and projecting downward therefrom, a plurality of vertical pump cylinders carried by the head, and communicating with the needles respectively, pistons slidable in the cylinders, a supply manifold for treating fluid interconnecting the pistons for simultaneous movement and communicating with the cylinders through passages in the pistons, driving means, and linkage directly mechanically connecting the driving means to the head and the supply manifold simultaneously to both reciprocate the head and move the pistons in the cylinders.

4. Apparatus for treating meat and the like comprising a support to hold a body of material to be treated, a head mounted above the support for vertical reciprocation toward and away from the support, a plurality of hollow needles carried by the head and projecting downward therefrom, a plurality of vertical pump cylinders carried by the head, and communicating with the needles respectively, pistons slidable in the cylinders, a supply manifold for treating fluid carried by the head and communicating with the cylinders, a member interconnecting the pistons for simultaneous movement, driving means, means mounting the support for horizontal movement beneath the head, means connecting the driving means to the head to reciprocate the head, means connecting the driving means directly to the member to move the pistons in the cylinders simultaneously with movement of the head, and means connecting the driving means to the support to move it in timed relation to reciprocation of the head.

5. An apparatus adapted to treat meat or the like and comprising a frame structure, means on the frame structure for supporting the meat to be treated, a horizontally elongated head positioned over the supporting means and mounted on the frame structure so that it is bodily movable towards and away from the supporting means, a series of fixed downwardly extending spaced apart hollow needles carried by the head to be inserted into the meat on the supporting means and withdrawn therefrom as the head moves down and then up, a drive motor, a mechanical linkage drivably connecting the motor to the head to move the head towards and away from the supporting means, mechanism drivably connected to the motor to feed the meat a predetermined distance under the head each time the head is moved towards and away from the supporting means, positive displacement liquid pump means including casing parts in fluid communication with the hollow needles and piston parts movable in the casing parts to displace liquid therefrom through the needles, and means providing a direct mechanical driving connection between the motor and the piston parts to effect a positive discharge of a predetermined quantity of liquid from the casing parts through the needles each time the head is moved toward the supporting means.

6. An apparatus adapted to treat meat or the like and comprising a frame structure, means on the frame structure for supporting the meat to be treated, a horizontally elongated head positioned over the supporting means and mounted on the frame structure so that it is bodily movable towards and away from the supporting means, a series of fixed downwardly extending spaced apart hollow needles carried by the head to be inserted into the meat on the supporting means and withdrawn therefrom as the head moves down and then up, a drive motor, a mechanical linkage drivably connecting the motor to the head to move the head towards and away from the supporting means, mechanism drivably connected to the motor to feed the meat a predetermined distance under the head each time the head is moved towards and away from the supporting means, positive displacement liquid pump means in fluid communication with the hollow needles, means to arrest the head after a predetermined movement thereof toward the supporting means, and means providing a direct mechanical driving connection between the linkage and the pump means and effective only after arrest of the head to operate the pump means to effect a positive discharge of a predetermined quantity of liquid from the pump means through the needles.

7. An apparatus adapted to treat meat or the like and comprising a frame structure, means on the frame structure for supporting the meat to be treated, a horizontally elongated head positioned over the supporting means and mounted on the frame structure so that it is bodily movable towards and away from the supporting means, a series of fixed downwardly extending spaced apart hollow needles carried by the head to be inserted into the meat on the supporting means and withdrawn therefrom as the head moves down and then up, a drive motor, a mechanical linkage drivably connecting the motor to the head to move the head towards and away from the supporting means, mechanism drivably connected to the motor to feed the meat a predetermined distance under the head each time the head is moved towards and away from the supporting means, positive displacement liquid pump means in fluid communication with the hollow needles, said mechanical linkage including a spring adapted to yield in response to a predetermined force on the linkage, the pump means including relatively movable parts connected to the linkage at opposite ends of the spring so that the pump will be operated when the spring yields, and means to arrest the head after a predetermined movement thereof toward the supporting means so that continued movement of the motor and the mechanical linkage will cause the spring to yield and will effect a positive operation of the pump.

References Cited in the file of this patent

UNITED STATES PATENTS

| 751,555 | Prescott | Feb. 9, 1904 |
| 1,565,922 | Fullips | Dec. 15, 1925 |
| 2,322,228 | Staebler | June 22, 1943 |
| 2,466,772 | Kenyon | Apr. 12, 1949 |
| 2,503,147 | Applezweig | Apr. 4, 1950 |
| 2,520,719 | Henson | Aug. 29, 1950 |
| 2,587,024 | Avery | Feb. 26, 1952 |

FOREIGN PATENTS

| 123,230 | Great Britain | Feb. 20, 1919 |
| 502,486 | Germany | July 11, 1930 |